(No Model.)

T. S. QUINCEY.
STUB IDENTIFICATION RECEIPT BLANK.

No. 411,057. Patented Sept. 17, 1889.

Fig. 1.

No. 5749
Name
Membership No.
Date
Amount, $
By

No. 5750
Name
Membership No.
Date
Amount $
By

Fig. 2.

No. 5749

From the Mutual Accident Association of the N xxxxxx,

Received TWO DOLLARS, in payment of Indemnity and Expense Assessment, No. 12, in above Association

AUDITOR'S MEMORANDUM

No. 5750

From the Mutual Accident Association of the N xxxxxx,

Received TWO DOLLARS, in payment of Indemnity and Expense Assessment, No. 12, in above Association.

AUDITOR'S MEMORANDUM

Witnesses,
D. F. Mann.
Frederick F. Goodwin

Inventor,
Thomas S. Quincey
By, Offield & Towle
Atty's

N. PETERS, Photo-Lithographer, Washington, D. C.

UNITED STATES PATENT OFFICE.

THOMAS S. QUINCEY, OF CHICAGO, ILLINOIS.

STUB-IDENTIFICATION RECEIPT-BLANK.

SPECIFICATION forming part of Letters Patent No. 411,057, dated September 17, 1889.

Application filed June 14, 1888. Serial No. 277,125. (No model.)

*To all whom it may concern:*

Be it known that I, THOMAS S. QUINCEY, a citizen of the United States, residing at Chicago, in the county of Cook, State of Illinois, have invented certain new and useful Improvements in Stub-Identification Receipt-Blanks, of which the following is a specification.

The object of my invention is to provide a mailable coupon adapted for use as an acknowledgment of the payment of money, composed of stiff paper and detachably connected to a permanent stub to be preserved by the sender of the coupon as a record of the transaction, both stub and coupon containing matter complemental of each other, whereby one may be identified by the other.

As an example of the use to which my invention is peculiarly adapted, the business of insurance companies may be instanced. It is the custom of insurance companies and beneficiary lodges operating on the assessment plan to send the necessary receipts for the payment of assessments by their members or policy-holders upon postal-cards partly printed and partly written. As by this method no record of the transaction is provided, controversies often arise between the companies and the assured as to the mailing of such receipts, and the matter of proof by either party to the transaction becomes difficult. Hence arises a well-founded objection to such system. To write the receipt on each card, so that a copy may be taken thereof, would, where the number of policy-holders is large, involve a great deal of labor; and as in many instances the payments are to be made and receipts forwarded at about the same time, the sending out of such receipts would require a large clerical force.

My invention is designed to furnish means whereby such and similar business may be transacted with convenience and dispatch and a record kept of the transaction; and to these ends it consists in a stub-identification receipt-blank comprising a permanent stub and a detachably-connected coupon, each bearing matter complemental of the other, whereby one may be identified by the other, and composed of stiff paper, whereby the coupon is adapted for transmission through the mail, said coupon having space upon one side to receive an address and the necessary postage and a space on its reverse side for the reception of the communication.

In the accompanying drawings, Figure 1 is a face representation of two blank coupons or cards having spaces for the address and necessary postage and detachably connected to stubs bearing a number with appropriate spaces for a record of the name of the party to whom the coupon is sent, the number of the policy, the date of the receipt, the amount of money paid, and for the name of the person receiving the money. Fig. 2 is a representation of the reverse side of the coupons and stubs shown in Fig. 1.

In said drawings, A is the face or address side of a card-coupon with appropriate spaces for the address and for the affixing of a stamp by which said card is made mailable; B, the face side of a stub to which the coupon is detachably connected by means of the line of perforations $a\ b$.

C represents the reverse side of the card-coupons shown in Fig. 1, and D the reverse side of the stubs shown in said figure. The communication—as, for example, uniform printed matter, such as an acknowledgment of the receipt of money—may be placed on the reverse side of the card, and several of these cards with their accompanying stubs may be formed on a single sheet of paper and adapted to be separated from each other by lines of perforations. Sheets of these blanks are bound up together, the stubs remaining permanently in the book and preserved as a record, and the coupons being detached for mailing. The cards are numbered consecutively on the reverse side and the coupons correspondingly numbered on the face side, and thereby, when the cards are filled up and the name of the person to whom they are sent entered on the stub, a complete record of the transaction is preserved. The reverse side of the stub may be used as an audit memorandum, if desired.

The blanks are composed of stiff paper, whereby the coupon is adapted for transmission through the mails and rendered mailable simply by detaching it from its stub and affixing the necessary post-stamp on the address side. When the blanks are bound up in book form, they are preferably provided with perforations, whereby they may be severed, as shown in the drawings at c d.

By the use of my invention acknowledgment of the payment of money to a large number of persons may be speedily made with little labor, and a complete record of the transaction kept by the person making the acknowledgment and preserved as evidence.

Having described my invention, what I claim as new, and desire to secure by Letters Patent, is—

1. The herein-described stub-identification receipt-blanks, comprising, in combination, permanent stubs and detachably-connected coupons, each bearing matter complemental of the other, whereby one may be identified by the other, and composed of stiff paper, whereby the coupons are adapted for transmission through the mail, said coupons having space upon one side to receive an address and the necessary postage and a space on the reverse side for the reception of the communication, substantially as described, and for the purpose set forth.

2. The herein-described stub-identification receipt-blanks, comprising a series of sheets bound together to form a book, and each sheet composed of a permanent stub and a coupon detachably connected thereto, the stub and coupon each bearing matter complemental of the other, whereby one may be identified by the other, and made of stiff paper, whereby the coupon is adapted for transmission through the mail, and having a space upon one side to receive an address and the necessary postage and a space on its reverse side for the reception of the communication, substantially as described, and for the purpose set forth.

THOMAS S. QUINCEY.

Witnesses:
C. C. LINTHICUM,
T. D. BUTLER.